United States Patent [19]

Karpinski, Jr.

[11] Patent Number: 5,094,537
[45] Date of Patent: Mar. 10, 1992

[54] SIGNAL PROCESSING SYSTEM FOR CORRECTING RING LASER GYROSCOPE READOUT

[75] Inventor: Andrew J. Karpinski, Jr., Clearwater, Fla.

[73] Assignee: Honeywell Inc., Minneapolis, Minn.

[21] Appl. No.: 666,539

[22] Filed: Mar. 8, 1991

[51] Int. Cl.⁵ .................................... G01C 19/66
[52] U.S. Cl. ................................................ 356/350
[58] Field of Search ..................................... 356/350

[56] References Cited

U.S. PATENT DOCUMENTS 4,791,460 12/1988 Bergstrom et al. .................. 356/350

Primary Examiner—Vincent P. McGraw
Attorney, Agent, or Firm—Robert A. Pajak

[57] ABSTRACT

An RLG signal processing system in which RLG quadrature errors are corrected by adding to one signal a portion of the other signal whose magnitude is a function of the magnitude of the quadrature error. Output buffer amplifiers restore the output signal to equal amplitude.

6 Claims, 2 Drawing Sheets

SIGNAL PROCESSING SYSTEM FOR CORRECTING RING LASER GYROSCOPE READOUT

BACKGROUND OF THE INVENTION

1. Field of the Invention

The present invention generally relates to an improvement in ring laser gyroscope signal processing systems, and more particularly to a signal processing system for adjusting the relative phase angle of the rate readout signals to establish a quadrature relationship between them.

2. Description of the Prior Art

As will be appreciated by those skilled in the art, a ring laser gyroscope (RLG) of the type contemplated by this invention, comprises a pair of laser beams rotating in opposite directions about a closed loop path. Interference between the beams creates an interference pattern of alternately bright and dark bands. As the closed loop path rotates, the interference pattern of light and dark bands moves relatively to a photodetector optically coupled to the path. The detector output is a sinusoidal signal whose frequency is a function of rate of rotation of the closed loop path. As will also be appreciated by those skilled in the art, two signals are advantageously generated in response to the interference pattern that are phase displaced 90 degrees one from the other. This pair of quadrature signals allows the RLG signal processing system to determine direction of rotation as well as rate of rotation.

Ideally the quadrature signals are precisely 90 degrees out of phase with respect to one another. However, tolerances in the RLG components and in its assembly procedure can and do cause quadrature errors in the output signal in a completely assembled RLG, so that the phase difference between signals is greater or less than 90 degrees. To the extent there is a quadrature error there is a potential degradation in the maximum rate capability of the RLG.

SUMMARY OF THE INVENTION

One object of this invention is the provision of an RLG signal processing system that can simply and economically correct quadrature errors between the RLG output signals.

Briefly, this invention contemplates the provision of an RLG signal processing system in which RLG quadrature errors are corrected by adding to one signal a portion of the other signal whose magnitude is a function of the magnitude of the quadrature error. Output buffer amplifiers restore the output signal to equal amplitude.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
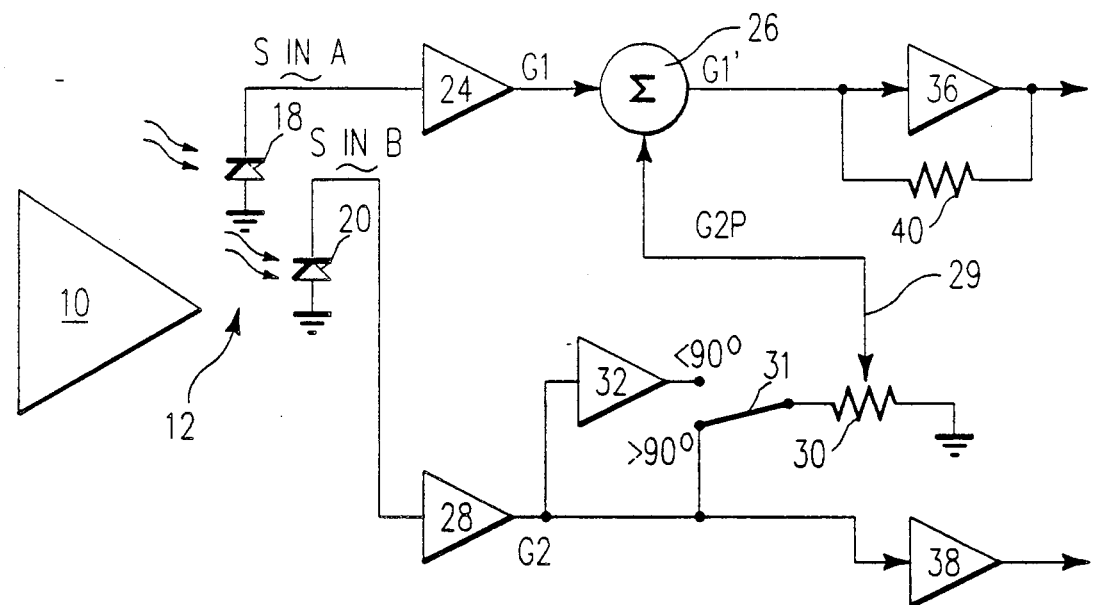
FIG. 1 is a schematic diagram illustrating the principals of applicant's invention.

Referring now to FIG. 1, the general reference numeral 10 indicates a conventional solid block ring laser gyroscope in which a two-counter rotating laser beams propagate about a closed loop path formed by chambers and mirrors in the block. An optical detector 12 is located adjacent the beam path so that it "sees" the interference pattern of alternating relatively bright and dark regions formed by the counter-rotating beams. The detector 12 may be of a suitable prior art design; and includes a pair of photodiodes 18 and 20.

As the beam path rotates, the interference pattern moves relatively to the detector 12 and the photodiodes 18 and 20 each generate a sinusoidal output signal, respectively Sin A and Sin B, whose frequency is a function of the rate of path rotation. The detector 12 is designed so photodiodes 18 and 20 respectively respond to the interference pattern at locations 90 degrees out of phase with one another. These quadrature output signals from photodiodes 18 and 20 allow the signal processing system to determine direction of rotation as well as rate of rotation. As pointed out above, component and assembly tolerances can cause the outputs of the photodiodes to be more or less than the desired 90 degrees out of phase. The signal processing system of this invention permits electronic adjustment of the relative phase of the two photodiode signals in order to provide the desired quadrature relationship.

If there is a quadrature error, a portion of one signal is added to the other to phase shift the other so that a quadrature relationship is established between the signals. To this end, in this illustrative embodiment of the invention, the output of photodiode 18 is coupled to a preamplifier 24 whose output (G1) is coupled to a summing junction 26. The output of photodiode 20 is coupled to a preamplifier 28 and its output (G2) is coupled to a variable resistor 30 via a switch 31 and an invertor 32. Switch 31 directly connects the output G2 to resistor 30 if G2 is more than 90 degrees out of phase with respect to G1. If G2 is less than 90 degrees out of phase with respect to G1, switch 31 connects G2 to resistor 30 via invertor 32, providing a 180° phase shift in the G2 signal coupled to the resistor. A wiper 29 couples a portion of the G2 signal across resistor 30 to another input of summing junction 26.

If the signals G1 and G2 are greater than 90 degrees apart, for a deviation from 90 degrees of $\Delta\Theta$ the magnitude of the signal G2P coupled to the summing junction from resistor 30 to phase shift G1 by an amount equal in magnitude to the deviation $\Delta\Theta$ is; $G2P = G1/\sin \Delta\Theta$. Similarly, if the signals G1 and G2 are less than 90 degrees apart, for a deviation of $\Delta\Theta$, the magnitude of the signal G2P coupled to the summing junction remains; $G2P = G1/\sin \Delta\Theta$, but the signal G2P in this case is shifted 180 degrees by invertor 32 and switch 31.

In operation it will be appreciated that the phase difference between G1 and G2 can be determined using a suitable instrument such as an oscilloscope, and the output G2 accordingly coupled to the resistor 30 either directly or via invertor 32 as appropriate. The variable resistor can be used to adjust the magnitude of the signal coupled to the summing junction (G2P) until the instrumentation indicates the desired quadrature relationship has been established between G1 and G2.

The output (G1') of summing junction 26 is coupled to a buffer amplifier 36; similarly, the output (G2) of preamplifier 28 is coupled to a buffer amplifier 38. In order to make the amplitudes of the outputs of the buffer amplifiers 36 and 38 equal, the gain A1 of amplifier 36 is adjusted relatively to the gain A2 of amplifier 38 so that A1=A2/cos ΔΘ. The value of feedback resistor 40 can be adjusted or selected to provide the desired gain for amplifier 36 relative to the gain of amplifier 38 which provides quadrature sinusoidal output of equal amplitude.

Figure 2:
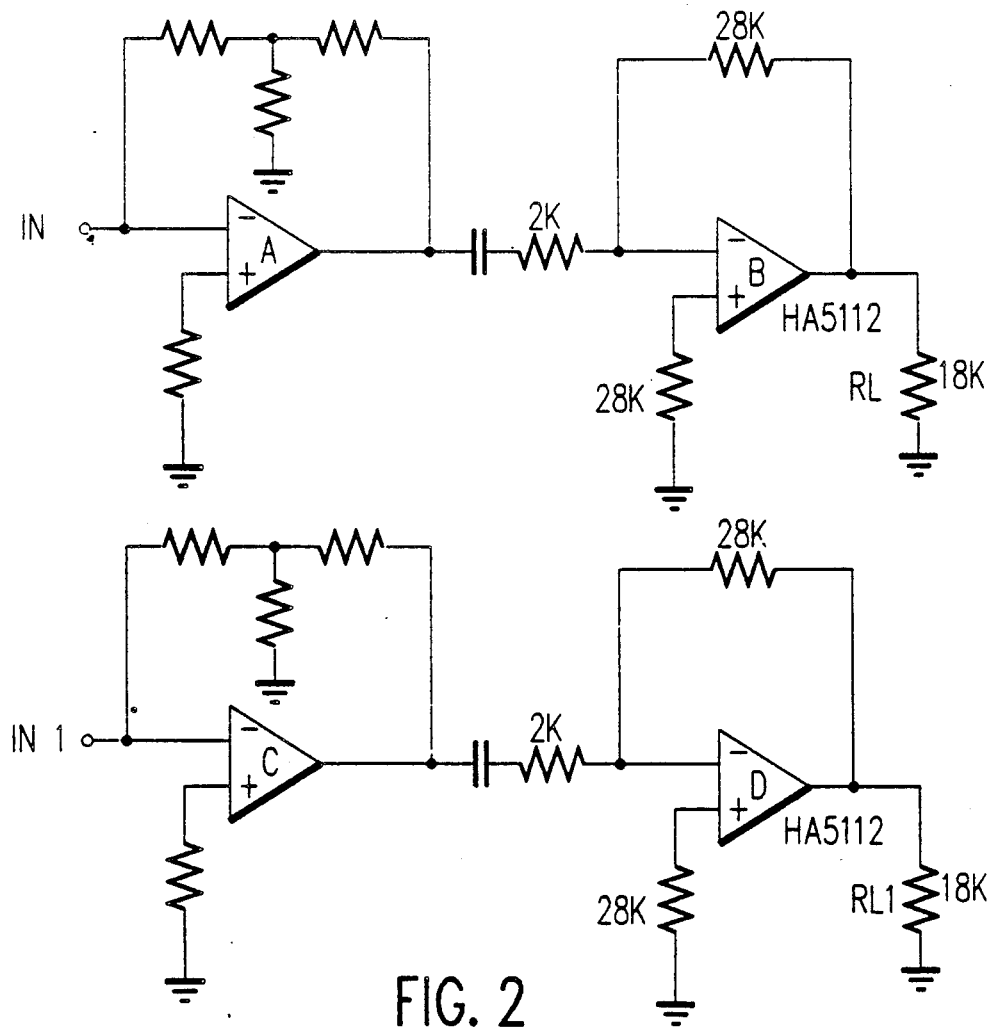
FIG. 2 is a schematic diagram of a prior quadrature signal preamplifier signal processing system with illustrative values.

FIG. 2 shows a typical pair of prior art readout preamplifiers. Diode 18 inputs Sin A through IN, for example, and diode 20 inputs Sin B through IN1. CP and CP1 represent the photodiode and wire capacitance. RL and RL1 represent the loads on the outputs. The preamplifier for IN comprises conventional operational amplifiers A and B and the preamplifier for IN1 comprises amplifiers C and D. There is no cross coupling between these amplifiers. Typical component values are shown on the drawing for illustrative purposes.

Figure 3:
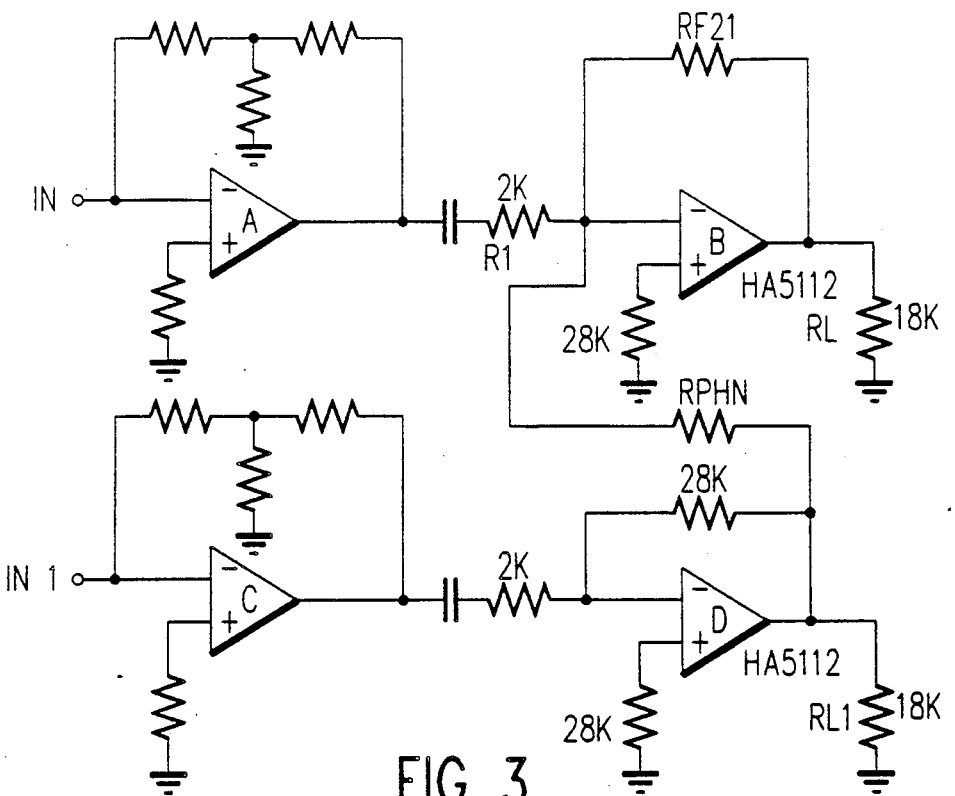
FIG. 3 is a schematic diagram of one specific embodiment of applicant's invention.

FIG. 3 shows the same preamplifier pair as in FIG. 2, but with a resistor RPHN coupling a portion of the IN1 signal to that of IN to correct a quadrature error. By properly selecting RPHN and feedback resistor RF21 of amplifier B, phase differences between Sin A and Sin B less than 90 degrees can be compensated to be exactly 90 degrees. The resistors are selected as follows:

$$RPHN = \frac{RF22}{\text{Sin } \Delta\Theta} \text{ and } RF21 = \frac{RF22}{\text{Cos } \Delta\Theta}$$

where ΔΘ is the deviation from 90 degrees of the phase difference between Sine A and Sine B before compensation. For example, if the phase difference between Sine A and Sine B is 54 degrees, then ΔΘ=90−54=36°, and RPHN=34K and RF21=24.7K.

Figure 4:
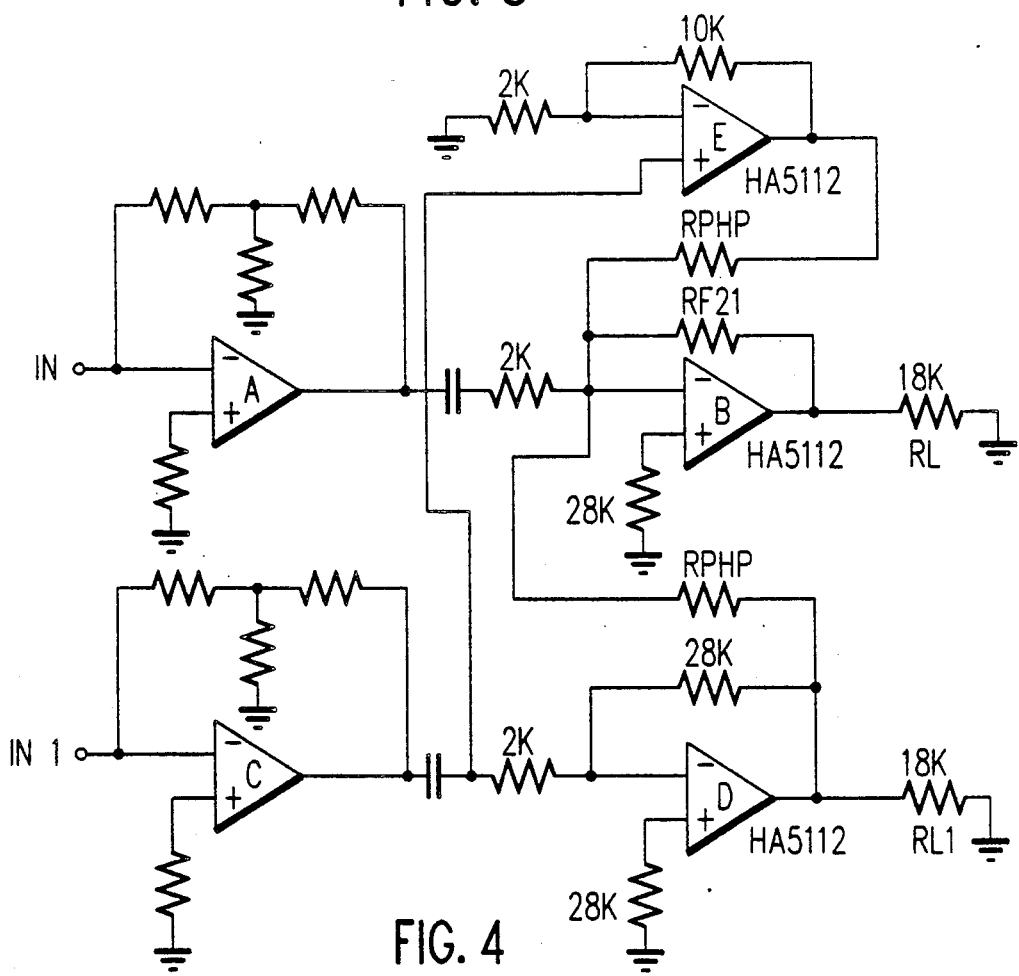
FIG. 4 is a schematic diagram of another specific embodiment of applicant's invention.

Theoretically, one could compensate phase differences greater than 90 degrees in the same fashion as above, except by summing the signal from one channel into the other channel with the opposite polarity of that shown in FIG. 3. However, FIG. 4 shows a preferred embodiment to correct phase differences greater than 90 degrees with additional amplifier E. RF21 and RPHP are selected to compensate the phase with:

$$RPHN = \frac{RF22}{\text{Sin } \Delta\Theta} \text{ and } RF21 = \frac{RF22}{\text{Cos } \Delta\Theta}$$

When ΔΘ is the deviation from 90 degrees of phase difference between Sine A and Sine B before compensation. In this embodiment, resistor RPHN would be an open circuit for phase differences greater than 90 degrees.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A ring laser gyroscope system comprising in combination:
   a pair of laser beams propagating in opposite directions about a closed-loop path producing an interference pattern of alternating relatively bright and dark regions;
   means for generating a pair of sinusoidal output signals nominally in a quadrature relation in response to movement of said pattern;
   means for correcting a quadrature error in the phase relation between said pair of sinusoidal output signals, and
   said correcting means including means to add to one signal of said pair a portion of the other signal of said pair where the magnitude of said portion is a function of said deviation.

2. A ring laser gyroscope system as in claim 1 wherein said function is the Sin of said deviation.

3. A ring laser gyroscope system as in claim 2 wherein said means for correcting includes an operational aplifier.

4. A ring laser gyroscope system as in claim 1 further including means for equalizing the amplitudes of said signals.

5. A ring laser gyroscope system as in claim 2 further including means for equalizing the amplitudes of said signals.

6. A ring laser gyroscope as in claim 4 wherein said equalizing means includes a pair of buffer amplitudes whose respective gains A1 and A2 are related so that: A1=A2/COS ΔΘ, where ΔΘ equals said deviation.

* * * * *